(12) United States Patent
Ono

(10) Patent No.: US 10,712,202 B2
(45) Date of Patent: Jul. 14, 2020

(54) COLOR MEASURING POSITION PROVISION SYSTEM AND COLOR MEASURING POSITION PROVISION METHOD

(71) Applicant: KONICA MINOLTA, INC., Tokyo (JP)

(72) Inventor: Koichi Ono, Kasukabe (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 53 days.

(21) Appl. No.: 16/159,934

(22) Filed: Oct. 15, 2018

(65) Prior Publication Data

US 2019/0170582 A1 Jun. 6, 2019

(30) Foreign Application Priority Data

Dec. 4, 2017 (JP) ................................ 2017-232296

(51) Int. Cl.
| | | |
|---|---|---|
| G06T 7/13 | (2017.01) | |
| G01J 3/46 | (2006.01) | |
| G06T 7/00 | (2017.01) | |
| G06T 7/73 | (2017.01) | |
| G01J 3/02 | (2006.01) | |
| G01J 3/50 | (2006.01) | |

(52) U.S. Cl.
CPC .............. *G01J 3/463* (2013.01); *G01J 3/027* (2013.01); *G01J 3/0289* (2013.01); *G01J 3/0291* (2013.01); *G01J 3/50* (2013.01); *G06T 7/0006* (2013.01); *G06T 7/13* (2017.01); *G06T 7/75* (2017.01); *G01J 3/0264* (2013.01); *G06T 2207/30144* (2013.01)

(58) Field of Classification Search
CPC .. G01J 3/463; G01J 3/027; G06T 7/13; G06T 2207/30144; G06T 7/0006
See application file for complete search history.

(56) References Cited

FOREIGN PATENT DOCUMENTS

JP  2016070697 A  5/2016

*Primary Examiner* — Sam Bhattacharya
(74) *Attorney, Agent, or Firm* — Buchanan Ingersoll & Rooney PC

(57) ABSTRACT

There is a need to provide a color measuring position provision system and a color measuring position provision method capable of easily and reliably providing a user with a color measurement position on a printed matter without placing a measurement position provision guide on the printed matter. A color measuring position provision system includes: a color measurement position specifier that specifies a color measurement position on a printed matter; and a controller functioning as an object extractor that extracts a marker object candidate to perform color measurement at the color measurement position specified by the color measurement position specifier. The system extracts, as the marker object candidate, an object having a feature specifiable by a user during color measurement and provides the extracted object for a user.

13 Claims, 15 Drawing Sheets

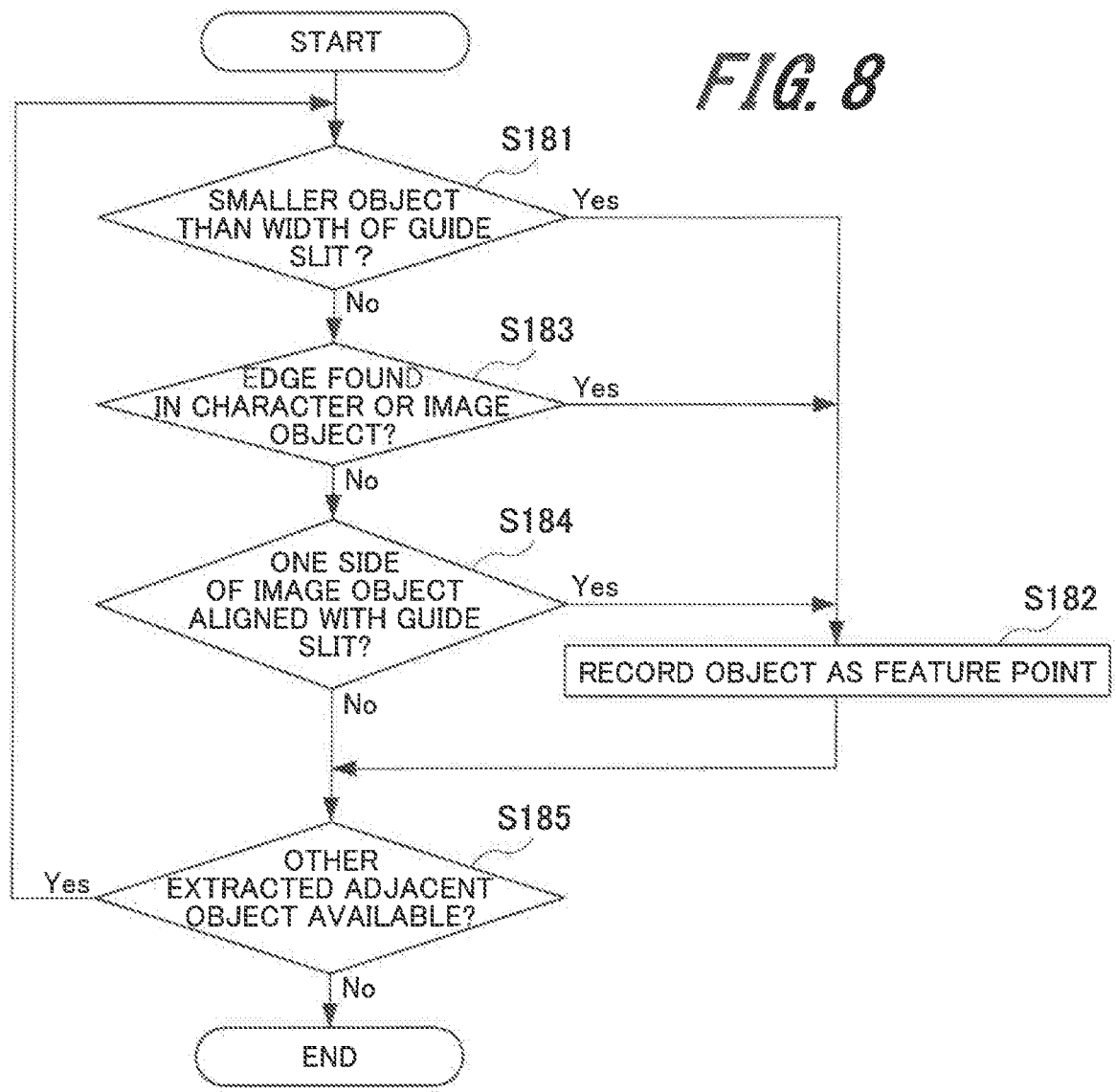

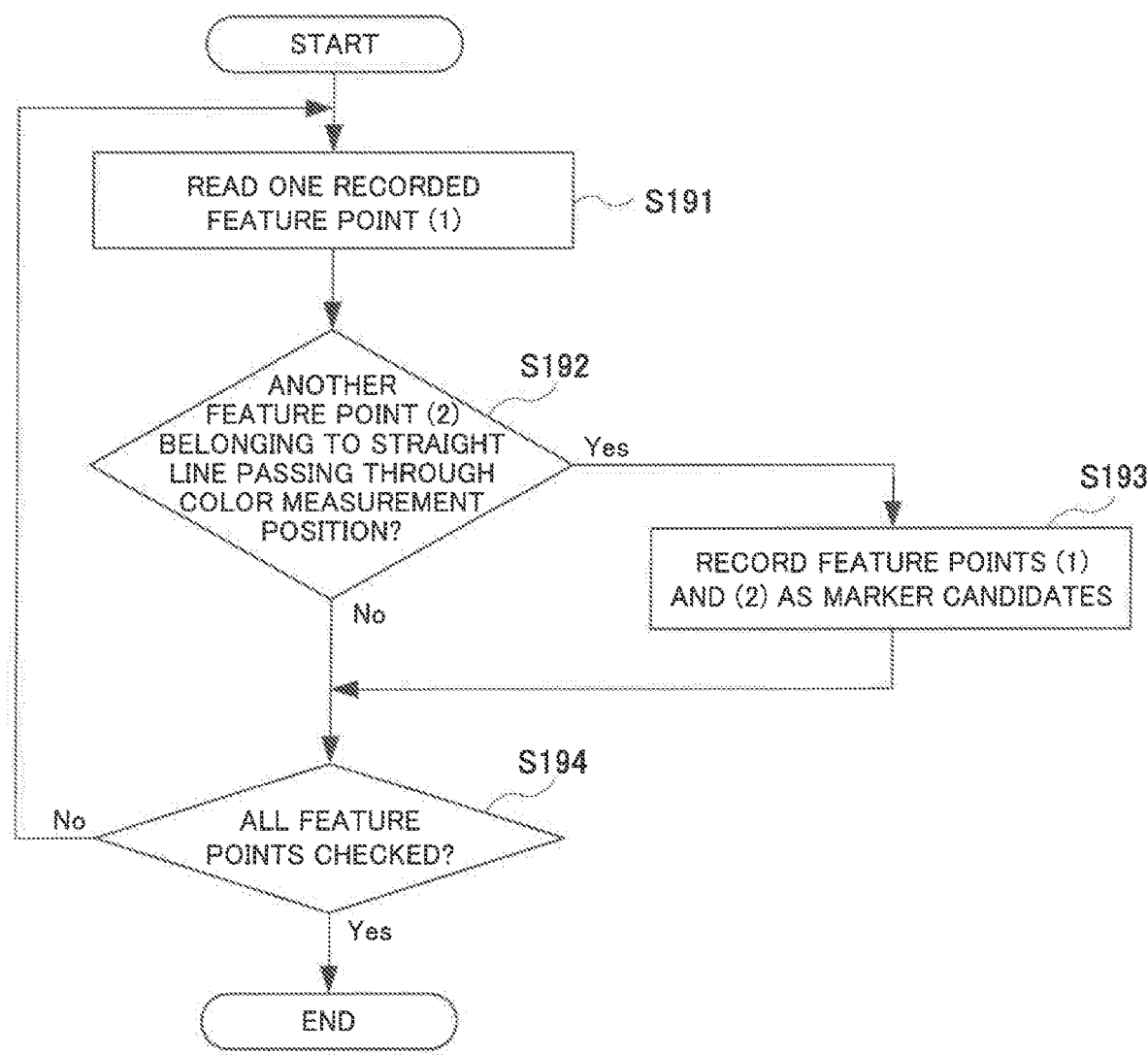

FIG. 13
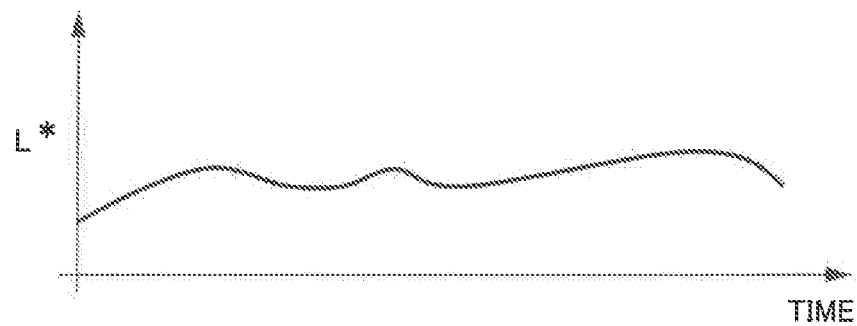
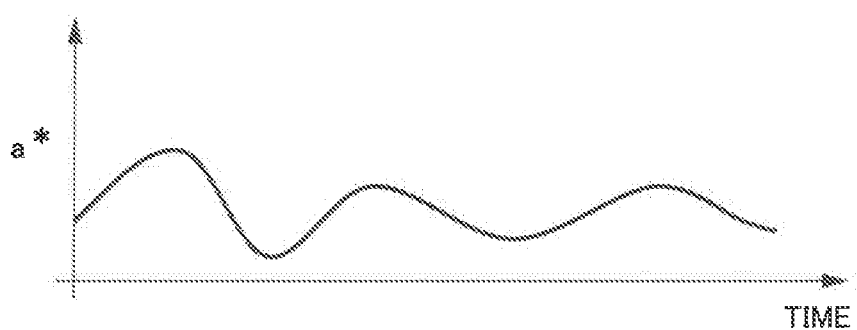
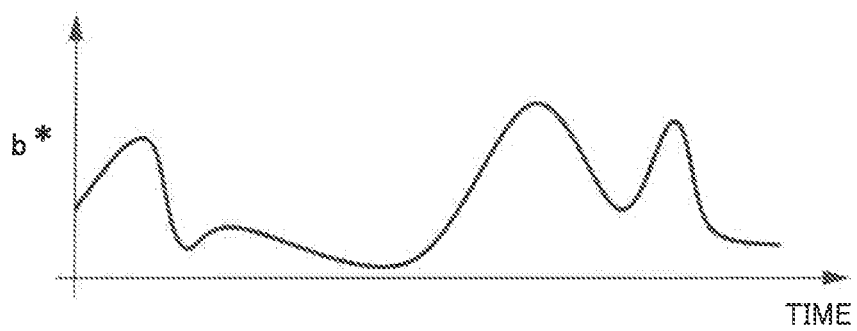

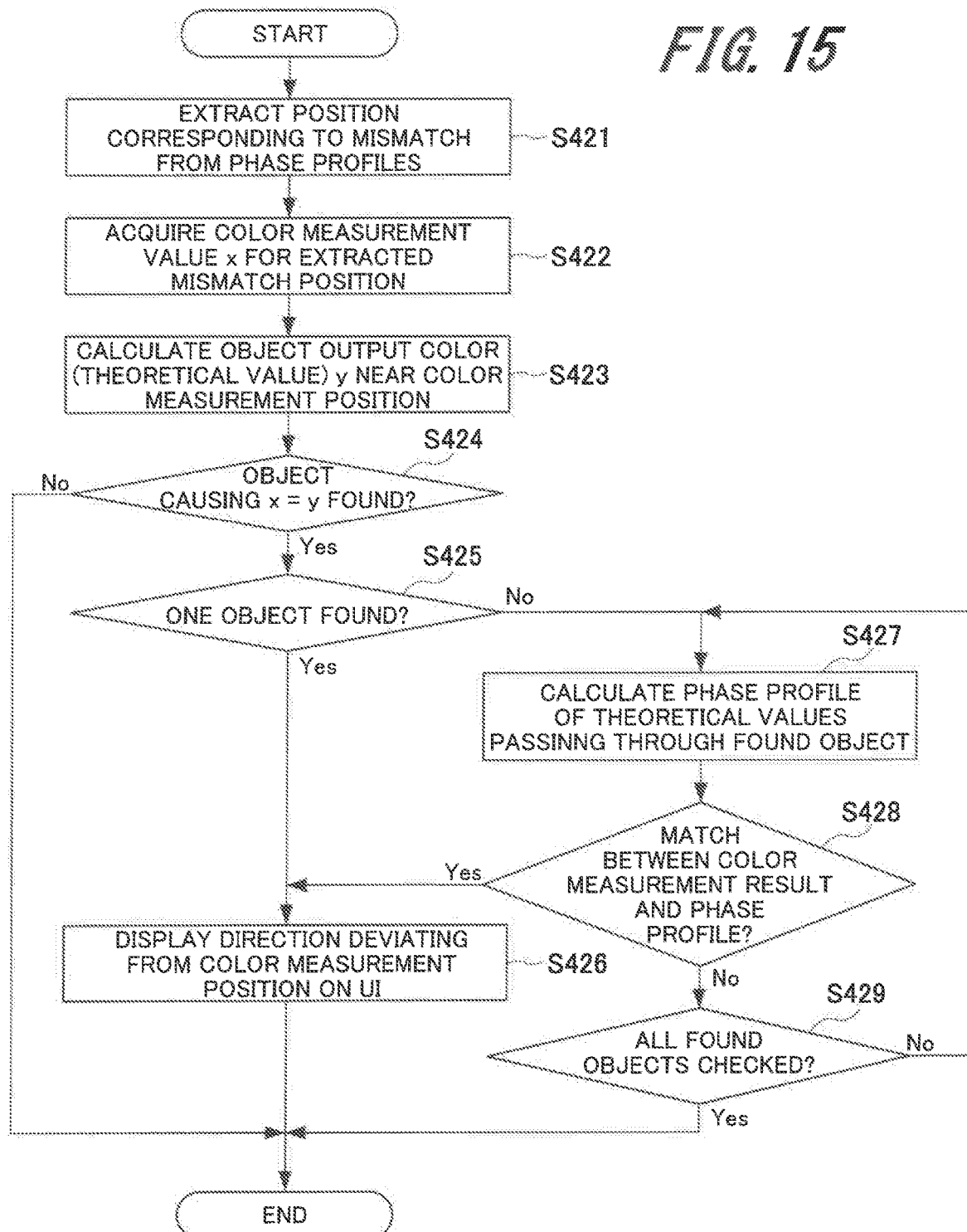

COLOR MEASURING POSITION PROVISION SYSTEM AND COLOR MEASURING POSITION PROVISION METHOD

CROSS-REFERENCE TO RELATED APPLICATIONS

The entire disclosure of Japanese Patent Application No. 2017-232296, filed on Dec. 4, 2017, is incorporated herein by reference in its entirety.

BACKGROUND

Technological Field

The present invention relates to a color measuring position provision system and a color measuring position provision method.

Description of the Related Art

From a viewpoint of ensuring the excellent print quality, a manual color measuring instrument may be used to perform spot color measurement at the specific position of an output printed matter in order to check colors of the printed matter. The spot color measurement may measure colors at several positions in the printed matter in order to check for a color change by measuring a color at the same position on each of several thousands of printed matters or to check for color unevenness within an area.

However, supposing that a small object is targeted at the spot color measurement using the manual color measuring instrument, the manual color measurement may be performed at a position slightly deviating from the object to inadvertently measure an adjacent color. Meanwhile, supposing that a large object is targeted at the color measurement, it is difficult to determine which of a plurality of specific colors near the object needs to be targeted at the color measurement, and the color measurement may be repeatedly performed at different positions.

According to the spot color measurement using the manual color measuring instrument, color measurement positions vary from one operator to another. A possible technique to solve this issue may display a color measurement position on a manipulation screen-view of a personal computer and notify a user of the position. However, the color measuring instrument can detect only the measured color. Only the user manipulation determines whether the color measurement is performed at the correct position.

There is proposed a technology (see Patent Literature 1, for example) to provide a position for color measurement. Based on print image data, the technology generates a measurement position provision guide indicating a position to measure a printed matter and places the measurement position provision guide on the printed matter to provide the measurement position.

CITATION LIST

Patent Literature

Patent Literature 1: JP 2016-70697 A

SUMMARY

However, the related art disclosed in Patent Literature 1 requires a burdensome task such as producing a measurement position provision guide by manually cutting parts corresponding to a measurement region and an alignment region using a cutter, for example, out of a recording medium containing a printed image same as the one printed on a printed matter or placing the measurement position provision guide on the printed matter.

It is an object of the present invention to provide a color measuring position provision system and a color measuring position provision method capable of easily and reliably providing a user with a color measurement position on a printed matter without placing a measurement position provision guide on the printed matter.

To achieve at least one of the above-mentioned objects, according to an aspect of the present invention, a color measuring position provision system reflecting one aspect of the present invention is characterized by including: a color measurement position specifier that specifies a color measurement position on a printed matter; and an object extractor that extracts a marker object candidate to perform color measurement at the color measurement position specified by the color measurement position specifier. The system extracts, as the marker object candidate, an object having a feature specifiable by a user during color measurement and provides the extracted object for a user.

A color measuring position provision method according to the present invention is characterized by including: specifying a color measurement position, when available, on a printed matter; extracting a marker object candidate to perform color measurement at the specified color measurement position and notifying a user of the marker object candidate; and extracting, as the marker object candidate, an object having a feature specifiable by a user during color measurement.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention:

FIG. 8 is a flowchart illustrating a flow of a feature point extraction process;

FIG. 9 is a flowchart illustrating a flow of a marker candidate extraction process;

FIG. 13 is a waveform diagram illustrating a phase profile;

FIG. 15 is a flowchart illustrating a flow of an alternative color measurement position extraction process.

DETAILED DESCRIPTION OF EMBODIMENTS

Figure 1:
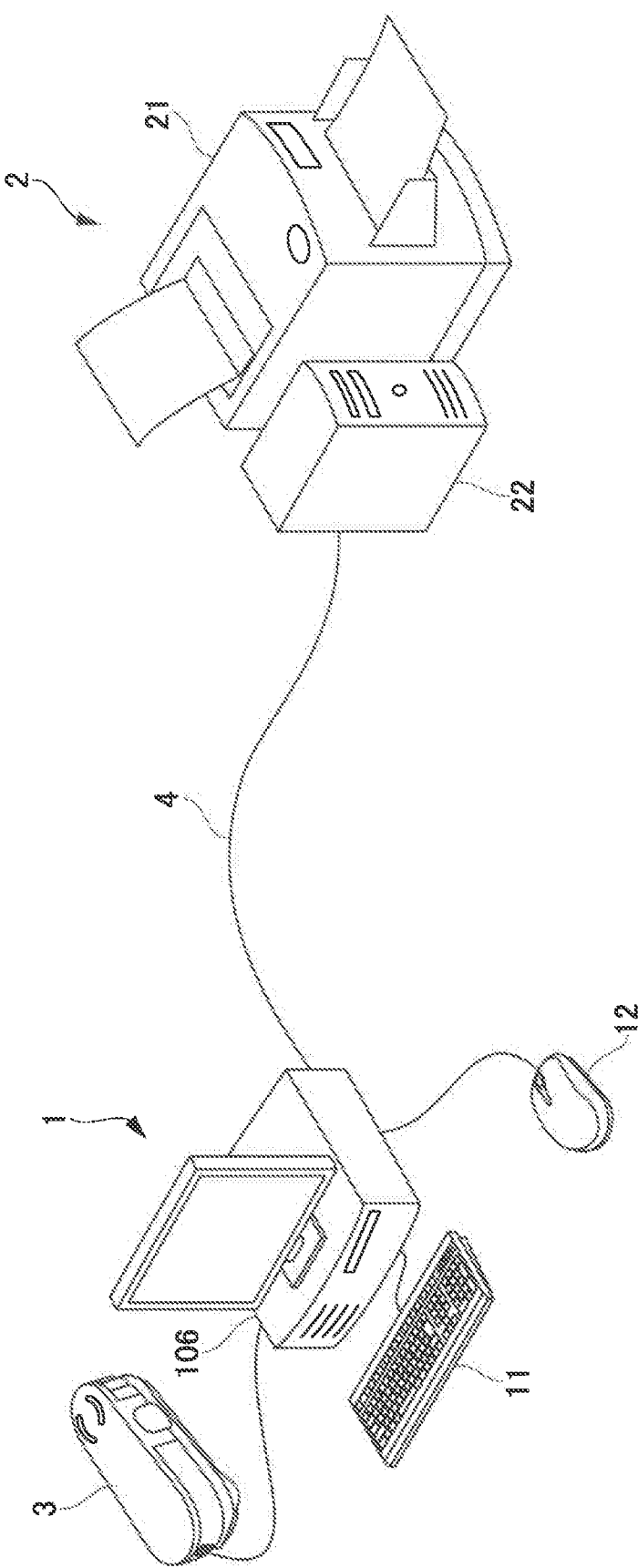
FIG. 1 is a system configuration diagram illustrating an overview of a system configuration of a print system to which the present invention is applied.

The description below explains in detail embodiments of the present invention with reference to the accompanying drawings. The present invention is not limited to the embodiments. The following description and the drawings use the same reference numeral for the same elements or elements having the same function. A duplicate description is omitted.

Print System

FIG. 1 is a system configuration diagram illustrating an overview of a system configuration of a print system to which the present invention is applied. As illustrated in FIG. 1, the print system includes a personal computer 1, a printer 2, and a manual color measuring instrument 3. The personal computer 1 connects with a keyboard 11 or a mouse 12.

The personal computer 1 includes such functions as a color measuring position provision system and a color measurement value detection system to be described later. In other words, the personal computer 1 includes the color measuring position provision system and the color measurement value detection system as software. The personal computer 1 is installed with a color management application to implement the functions of the color measuring position provision system and the color measurement value detection system.

The printer 2 includes a print engine 21 and a printer controller 22. The personal computer 1 and the printer controller 22 are connected via a communication line 4. The communication line 4 can represent a dedicated line, the Internet, or LAN (Local Area Network).

Figure 2:
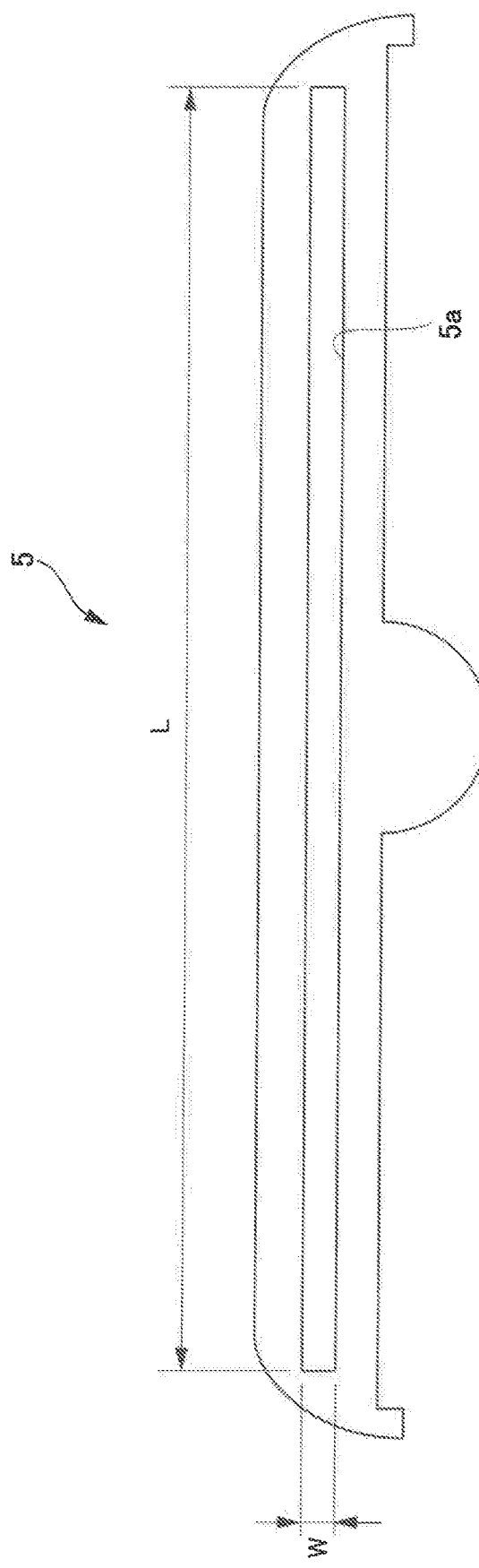
FIG. 2 is a plan view illustrating a guide rail of a manual color measuring instrument.

The manual color measuring instrument 3 is connected to the personal computer 1. From a viewpoint of ensuring excellent print quality, the manual color measuring instrument 3 performs color measurement at a specified position on a printed matter in order to check colors on a printed matter (such as paper) output from the printer 2. The color measurement using the manual color measuring instrument 3 generally uses a guide rail 5 as illustrated in FIG. 2.

The guide rail 5 includes a guide slit 5a that is formed along a longer direction and has length L and width W. A user places the guide rail 5 on a printed matter so that a color measurement position of the printed matter or an object including the color measurement position is positioned within the guide slit 5a. A user manipulates the manual color measuring instrument 3 so as to move along the guide slit 5a of the guide rail 5 and thereby measures a color at the color measurement position of the printed matter or a color of the object including the color measurement position (color measurement).

As above, scan color measurement (scan measurement) is performed by moving the manual color measuring instrument 3 to continuously measure colors on a printed matter. Meanwhile, spot color measurement (spot measurement) is performed by immovably placing the manual color measuring instrument 3 to measure colors in a minuscule area.

Color Measuring Position Provision System

The description below explains the color measuring position provision system comprised of the personal computer 1 in the above-mentioned print system.

Figure 3:
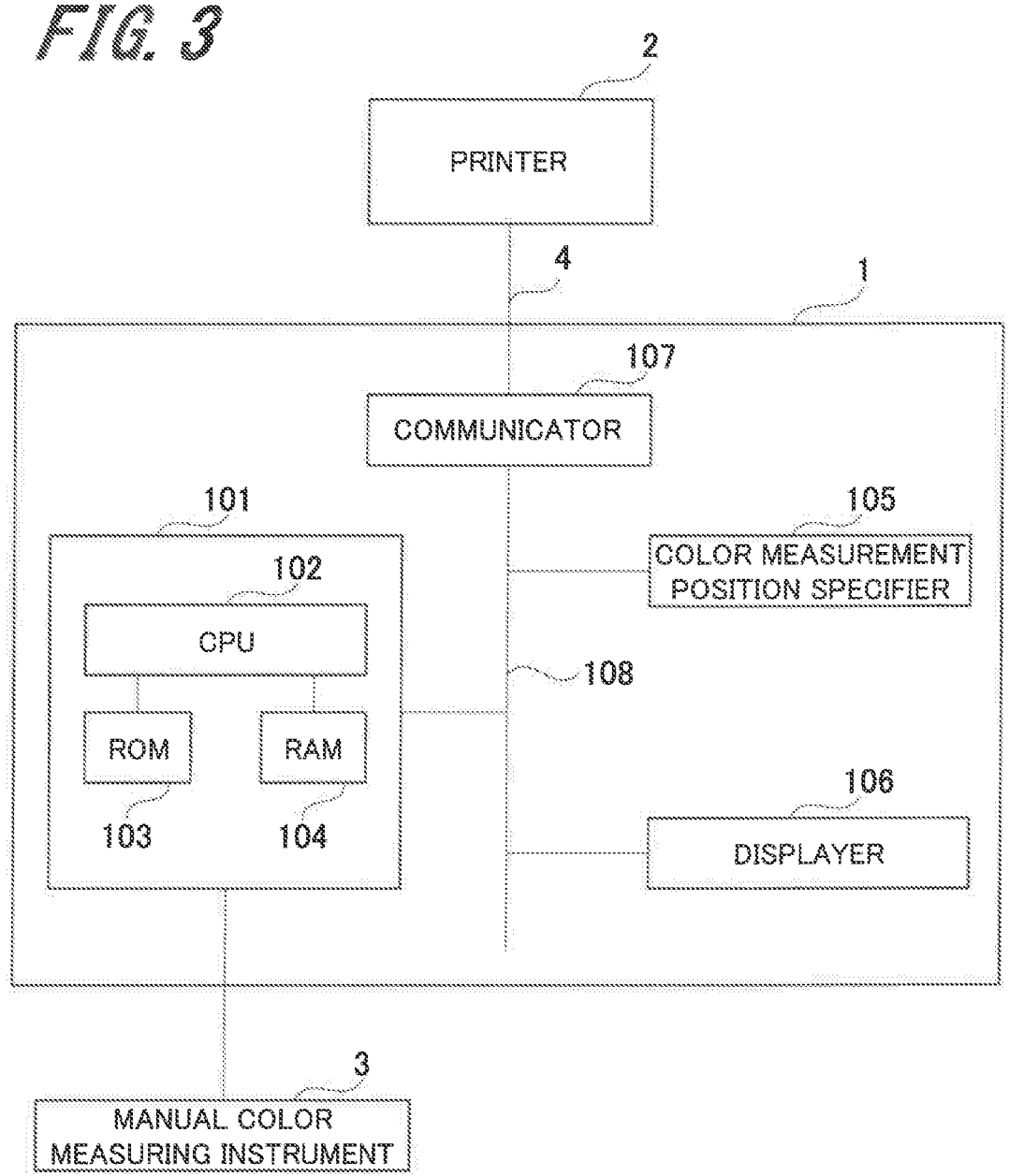
FIG. 3 is a block diagram illustrating an overview of a configuration of a color measuring position provision system according to an embodiment of the present invention.

FIG. 3 is a block diagram illustrating an overview of a configuration of the color measuring position provision system according to the embodiment of the present invention. The personal computer 1 configures the color measuring position provision system according to the present embodiment.

The personal computer 1 includes a controller 101 that provides control to implement functions of the color measuring position provision system according to the embodiment. The controller 101 includes a CPU (Central Processing Unit) 102, a ROM (Read Only Memory) 103, and a RAM (Random Access Memory) 104. The ROM 103 stores a program the CPU 102 executes. The RAM 104 is used as a work area for the CPU 102. The RAM 104 stores a color management application that implements the functions of the color measuring position provision system.

The controller 101 connects with a color measurement position specifier 105, a displayer 106, and a communicator 107 via a system bus 108. The color measurement position specifier 105 includes the keyboard 11 or the mouse 12 connected to the personal computer 1 and specifies color measurement positions on a printed matter based on the user manipulation. In other words, when performing the color measurement on a printed matter output from the printer 2, the user uses the keyboard 11 or the mouse 12 to specify the color measurement position of a printed matter on the displayer 106 of the personal computer 1.

When the user specifies the color measurement position, the controller 101 extracts a marker object candidate to perform color measurement at the color measurement position specified by the color measurement position specifier 105. Namely, the controller 101 includes the function as an object extractor that extracts a marker object candidate to perform the color measurement at the color measurement position.

The displayer 106 includes a liquid crystal display (LCD) or an organic EL (Electro Luminescence) display, for example. Under control of the controller 101, the displayer 106 notifies the user of a marker object candidate, if any, based on an extraction result of the object extractor function provided for the controller 101 by displaying an object corresponding to the marker object candidate on the screen.

Figure 4:
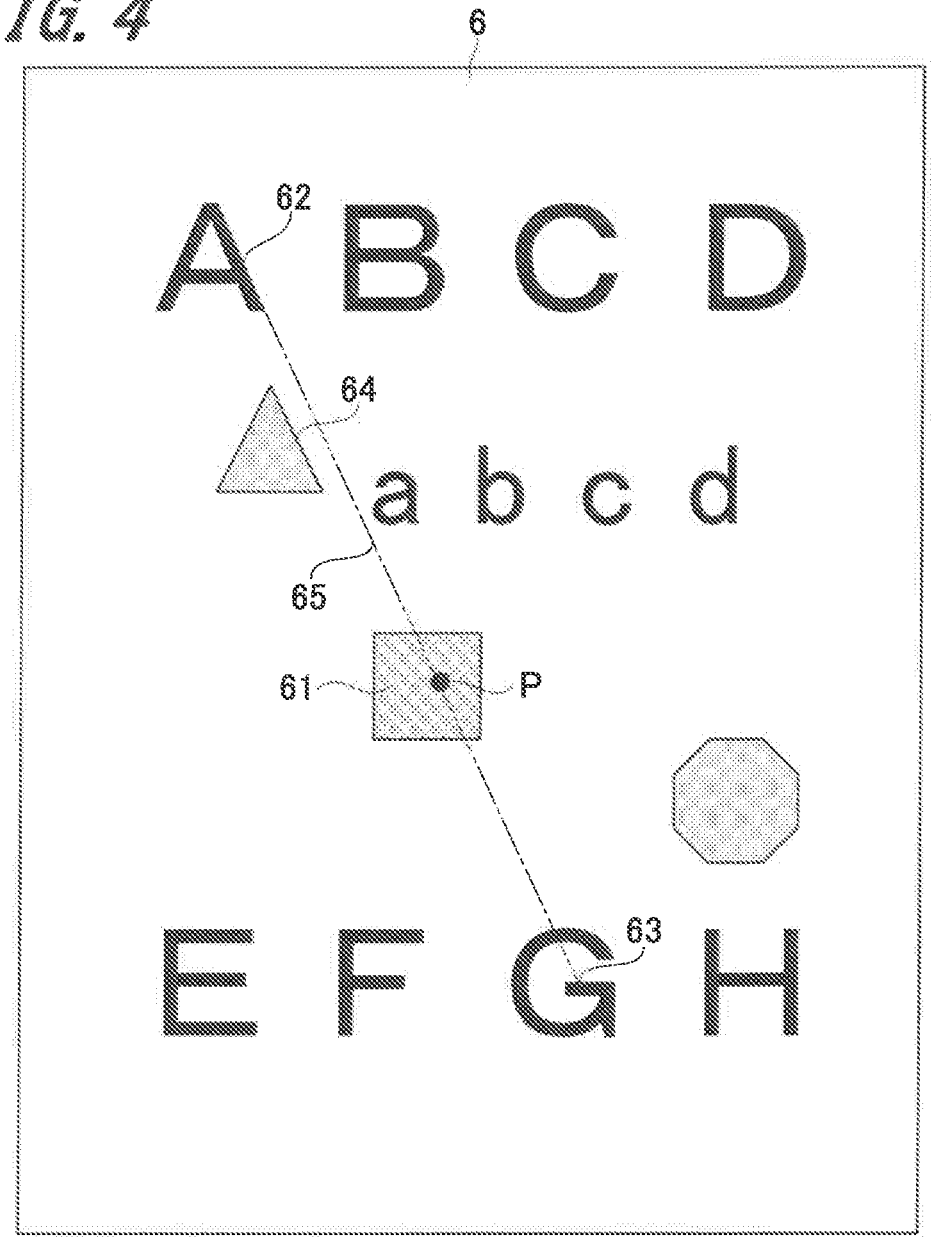
FIG. 4 illustrates a color image on a printed matter.

FIG. 4 illustrates a color image on a printed matter 6. The illustrated color images are schematic for ease of comprehension but are not limited thereto. It is supposed that the user specifies a given position as color measurement position P in a quadrilateral object 61 out of the color images on the printed matter 6. By specifying color measurement position P, a process is performed to extract a marker object candidate in order to perform the color measurement at color measurement position P.

The marker object candidate is extracted under conditions (1) through (3) below, for example.

(1) An object that can be aligned with the length of the guide slit 5a of the guide rail 5 based on color measurement position P as a reference point.

(2) An edge of a character or an image object such as an edge 62 of character A or an edge 63 of character G.

(3) One side of an image object aligned with the guide slit 5a of the guide rail 5 such as an oblique side 64 of a triangular object.

Object candidates are extracted under the above-mentioned conditions (1) through (3). These candidates are used to extract a marker object candidate, namely, an object within reach of the guide rail 5 of the manual color measuring instrument 3 from color measurement position P.

The marker object is extracted from the candidates extracted as above belonging to a straight line that concatenates the candidates and contains user-specified color measurement position P. For example, supposing that the edge 62 of character A or the edge 63 of character G is included in the extracted candidates, color measurement position P belongs to a straight line 65 concatenating the edges 62 and 63. The edge 62 of character A and the edge 63 of character G are therefore extracted as marker objects.

When the process extracts a plurality of marker objects, the system (the controller 101) can automatically determine the marker object out of the objects. Alternatively, the user can selectively determine the marker object.

The system can use priorities to automatically select and determine the marker object. As a result of the scan color measurement, priorities are available based on a color difference capable of edge detection available to an object near the color measurement position, the color measurement position available between marker objects, or the marker object being advantageously nearest to the color measurement position.

If no marker object is available, the user is provided with an alternative marker from the extracted marker object candidates belonging to a straight line that concatenates the candidates with each other and contains an object targeted at the color measurement. In this case, the alternative marker is comparable to a candidate advantageously nearest to the position of an object including the specified color measurement position.

The user can enter one of the marker objects. When the user specifies the marker object, remaining marker objects are extracted from the straight line concatenating the specified marker with the color measurement position.

As above, the color measuring position provision system according to the embodiment extracts marker object candidates to perform the color measurement at color measurement position P specified by the user on the printed matter 6. At this time, the system extracts the object having a feature enabling the user to specify during the color measurement as a marker object candidate and provides the extracted object for the user.

The provided object is equal to the marker object candidate to perform the color measurement at color measurement position P. As a result, color measurement position P can be provided for the user. The user provided with the marker object can use the guide rail 5, move the manual color measuring instrument 3 along the guide slit 5a of the guide rail 5 based on the marker object, perform scan color measurement, and thereby perform the color measurement at the specified color measurement position P.

Figure 5:
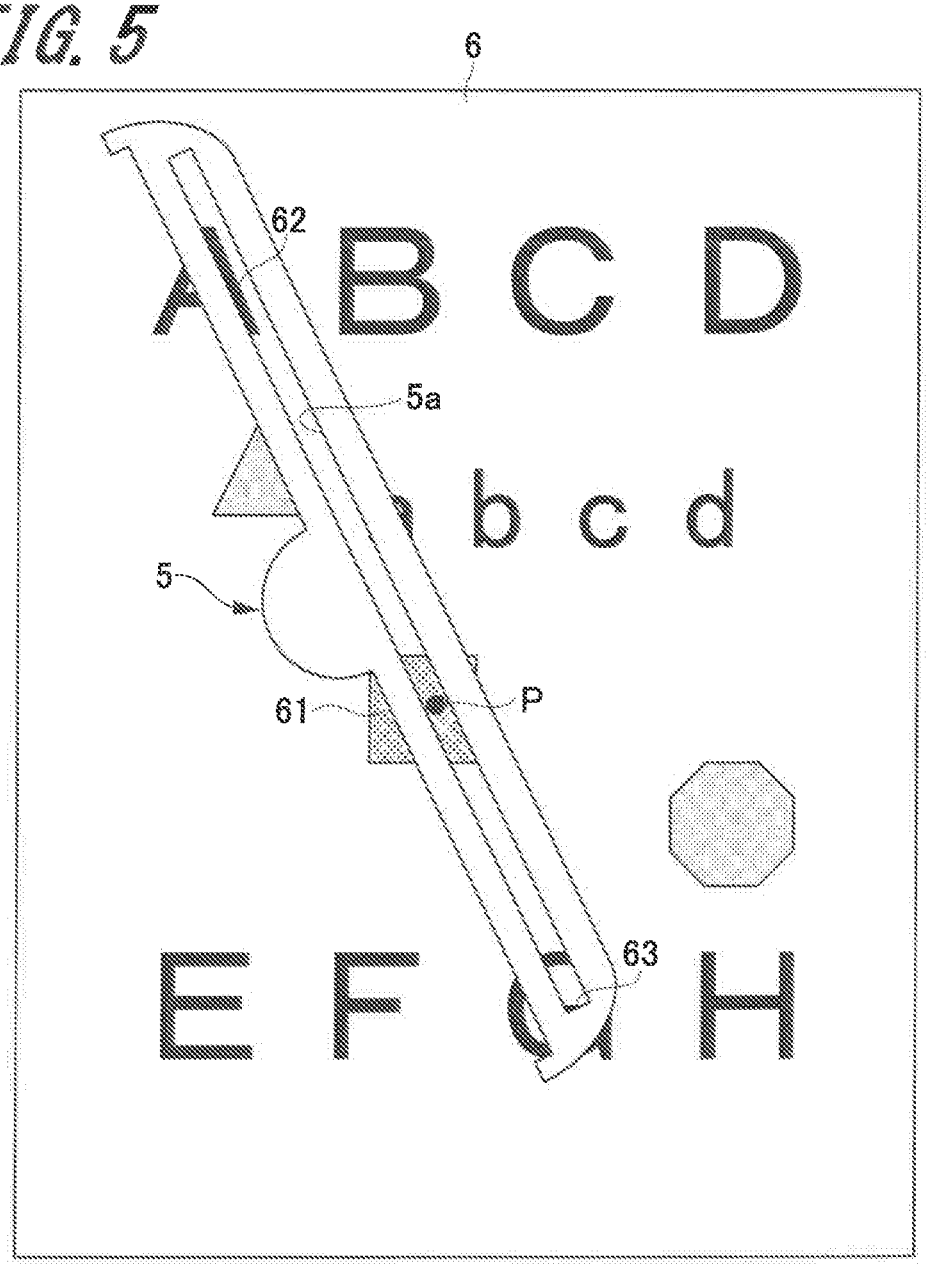
FIG. 5 is an explanatory diagram illustrating measurement of a color at a specified color measurement position by using the guide rail of the manual color measuring instrument.

The description below explains the color measurement when two points, namely, the edge 62 of character A and the edge 63 of character G, are extracted as marker object candidates on the printed matter 6 as illustrated in FIG. 4. In this case, as illustrated in FIG. 5, the guide rail 5 is placed so that the edge 63 of character G is used as the start point of the guide rail 5 and the edge 62 of character A and the edge 63 of character G are located within the guide slit 5a of the guide rail 5. Obviously, the specified color measurement position P is also located within the guide slit 5a. In this state, the scan color measurement can be performed by moving the manual color measuring instrument 3 along the guide slit 5a of the guide rail 5.

As above, the color measuring position provision system according to the embodiment of the present invention can easily and reliably provide the user with the color measurement position on a printed matter without placing a measurement position provision guide on the printed matter according to the related art as described in Patent Literature 1. The user can perform the color measurement at color measurement position P on the printed matter 6 based on the provided marker object candidate.

Color Measuring Position Provision Method

Figure 6:
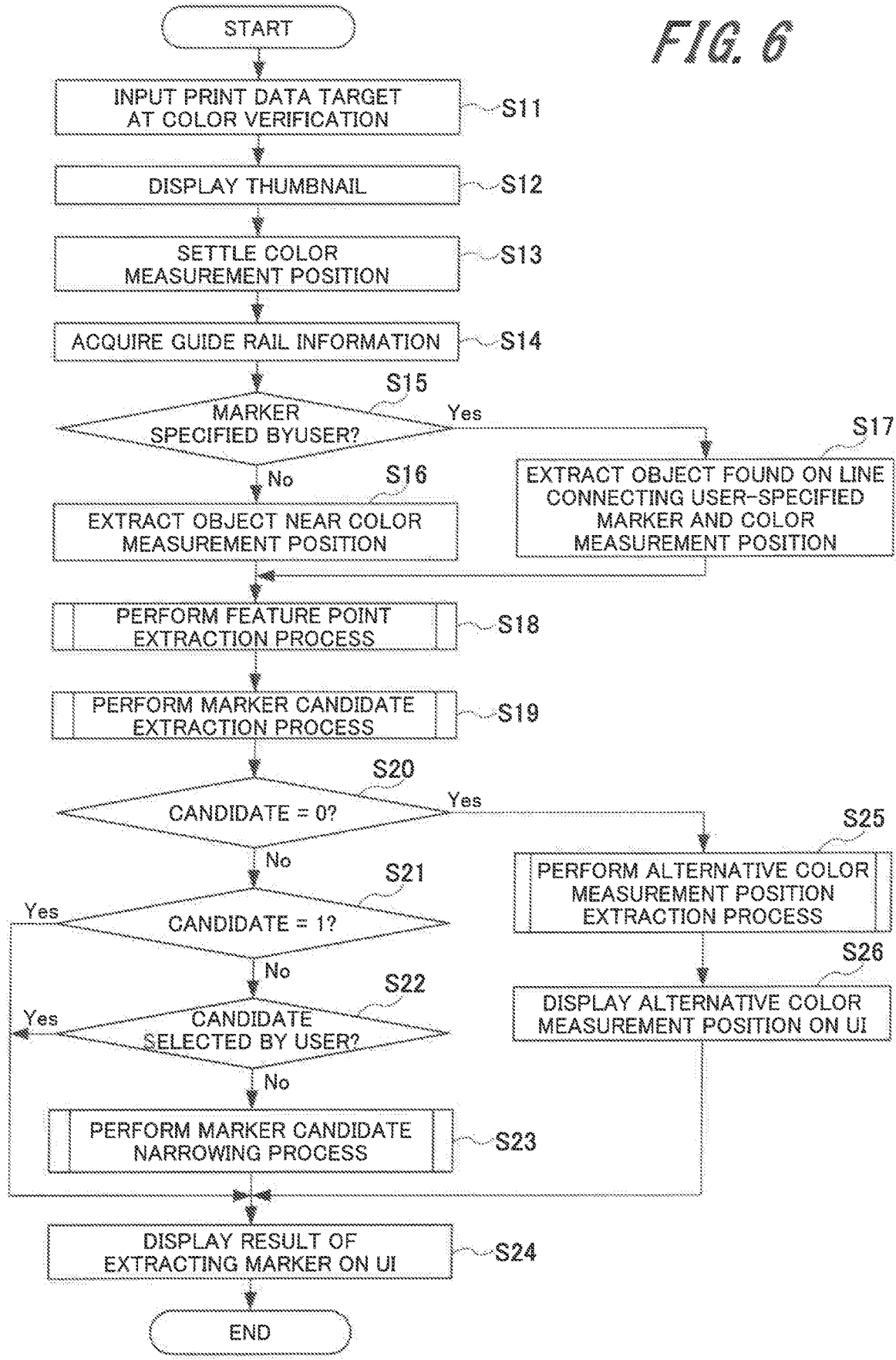
FIG. 6 is a flowchart illustrating a process flow of a color measuring position provision method performed in the color measuring position provision system according to the embodiment of the present invention.

With reference to a flowchart in FIG. 6, the description below explains a process according to a color measuring position provision method performed in the color measuring position provision system configured above. A series of processes to provide the color measurement position is performed under control of the controller 101. The same also applies to various processes to be described later.

Figure 7A:
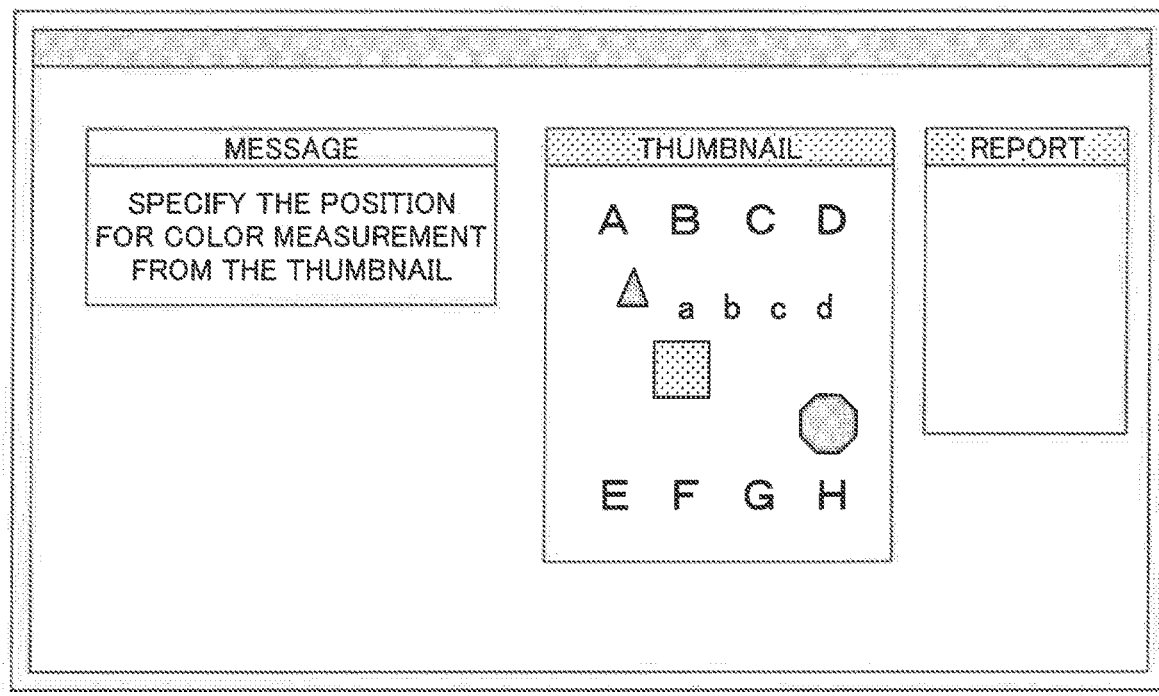
FIGS. 7A and 7B are screen-views to specify a position targeted at color verification, FIG. 7A illustrating displayed thumb-nails and a display example of specified color measurement position P.

The controller 101 inputs print data targeted at color verification to the color management application (step S11). The process generates a thumbnail based on the input print data and allows the displayer 106 of the personal computer 1 to display a screen-view that specifies a part targeted at the color verification (step S12). FIG. 7A illustrates a screen-view that specifies a part targeted at the color verification. At this time, the screen-view displays a message such as "specify the position for color measurement from the thumbnail."

Figure 7B:
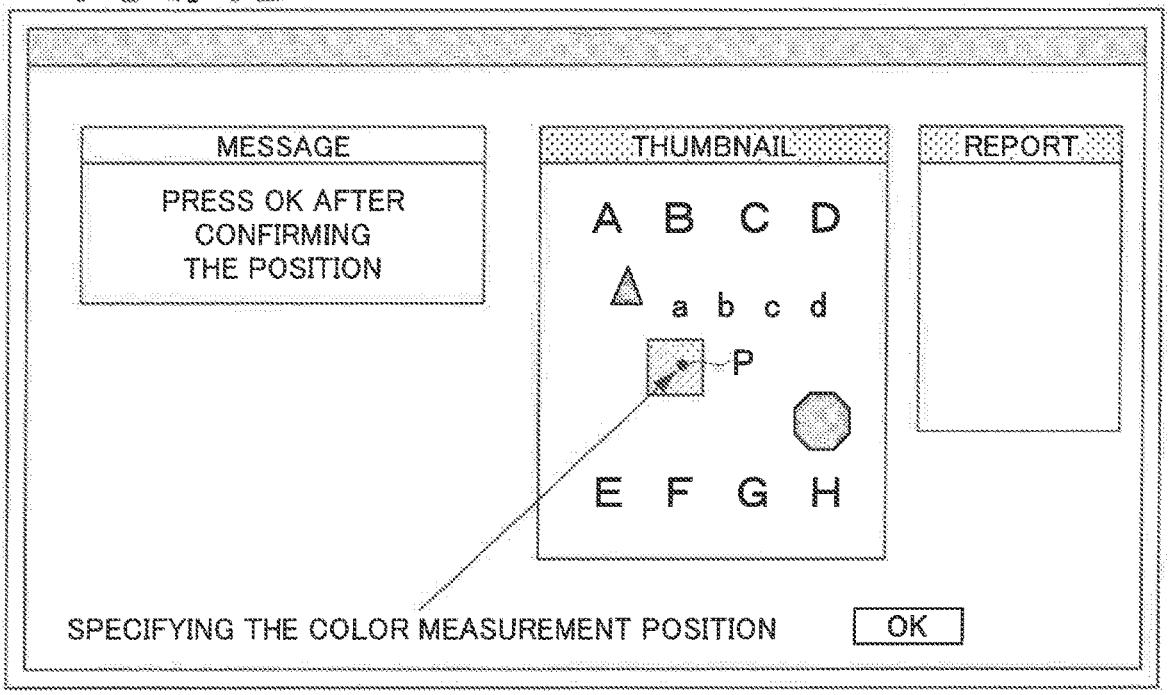

The user specifies color measurement position P from the thumbnail image in the screen-view displayed on the displayer 106 by using the mouse 12, for example. At this time, as illustrated in FIG. 7B, the screen-view displays the specified color measurement position P in the thumbnail image and a message such as "press OK after confirming the position." The user specifies color measurement position P and then clicks [OK]. In response to this, the controller 101 settles color measurement position P (step S13).

The controller 101 then acquires information about the guide rail 5, specifically, information such as length L or width W of guide slit 5a (step S14). The information about the guide rail 5 may be acquired by the user based on the user interface (UI) or may be maintained by the system for each manual color measuring instrument 3. The present example is described on the assumption that the system maintains the information.

The controller 101 then determines whether the user specifies a marker object (step S15). If the user specifies no marker object (No at S15), the process extracts an object in the vicinity of color measurement position P (step S16). The vicinity of color measurement position P signifies a range of distance in which the guide rail 5 of the manual color measuring instrument 3 is reachable from color measurement position P. If the user specifies a marker object (Yes at S15), the controller 101 extracts an object belonging to the straight line that concatenates the user-specified marker and color measurement position P (step S17).

The controller 101 then performs a process that extracts a feature point from the adjacent objects extracted by the process at step S16 or step S17 (step S18). The feature point has a feature the user can recognize as the start point of the guide rail 5. The method of extracting the feature point conforms to conditions (1) through (3) below.

(1) An object smaller than width W of guide slit 5a of the guide rail 5.

(2) An edge of a character or image object.

(3) One side of an image object aligned with the guide slit 5a of the guide rail 5.

A feature point extraction process will be described in detail later.

The controller 101 then performs a process that extracts a candidate from feature points extracted by the process at step S18 (step S19). The candidate can contain color measurement position P belonging to the straight line concatenating the feature points with each other. This marker candidate extraction process will be described in detail later.

The controller 101 determines whether the number of candidates extracted at step S19 is 0 (step S20). If the number of candidates is not 0 (No at S20), the process determines whether the number of extracted candidates is 1 (step S21). If the number of candidates is not 1 (No at S21), the controller 101 determines whether the user selects candidates (step S22). Namely, the user is allowed to select a candidate when a plurality of candidates are available. The candidate selection by the user may be predetermined in the system or may be specified by the user using the user interface as needed.

If the user does not select a candidate (No at S22), the controller 101 performs a marker candidate narrowing process (step S23). The marker candidate narrowing process narrows candidates to one under conditions (1) through (3) described below.

(1) A color difference capable of edge detection available to an object near the color measurement position after the scan measurement on the straight line concatenating extraction points.

(2) The color measurement position available between feature points.

(3) A short distance between two feature points.

If no candidate is available, the process extracts possible combinations of objects targeted at the color measurement from the line concatenating the feature points with each other, extracts a combination nearest to the position specified as color measurement position P, and displays a screen-view prompting the user to change the color measurement position and select a candidate. The marker candidate narrowing process will be described in detail later.

The controller 101 displays a result of extracted markers, namely, a combination of extracted feature points in the thumbnail image and notifies the user to perform the scan color measurement by aligning the guide slit 5a of the guide rail 5 to the feature point (step S24). Instead of the scan color measurement, the spot color measurement can be notified.

Supposing that the number of candidates is 1 (Yes at S21) or the user selects a candidate (Yes at S22), the controller 101 directly proceeds to step S24 and performs a process to display a result of extracting the marker.

If the number of candidates is 0 after the process at step S20 (Yes at S20), the controller 101 performs a process to extract an alternative color measurement position (step S25) and provides the user with the extracted alternative color measurement position by displaying it on the displayer 106 (UI: user interface) of the personal computer 1 (step S26). That is, if no marker object is available, the candidate nearest to the object position specified as color measurement position P is extracted as an alternative color measurement position from the extracted marker object candidates belonging to the straight line concatenating the candidates with each other and containing objects targeted at the color measurement and is provided to the user. An alternative color measurement position extraction process will be described in detail later.

Feature Point Extraction Process

With reference to a flowchart in FIG. 8, the description below explains the feature point extraction process as the process at step S18 in FIG. 6. The feature point extraction process extracts a feature point having a feature recognizable by the user as the start point of the guide rail 5 from adjacent objects extracted by the process at step S16 or S17 as follows.

The controller 101 determines whether an object is smaller than width W of the guide slit 5a of the guide rail 5 (step S181). If the object is smaller than width W (Yes at S181), the object is recorded as a feature point (step S182). If the object is larger than width W of the guide slit 5a (No at S181), the controller 101 determines whether the character or image object has an edge (step S183). If an edge is found (Yes at S183), the process proceeds to step S182 and records the object as the feature point.

If no edge is found (No at S183), the controller 101 determines whether one side of an image object is aligned with the guide slit 5a of the guide rail 5 (step S184). If there is an image object having one side aligned with the guide slit 5a (Yes at S184), the process proceeds to step S182 and records the image object as a feature point. When there is no image object having one side aligned with the guide slit 5a (no at S184) or the process at step S182 is completed, the controller 101 determines whether other extracted adjacent objects are available (step S185).

If other extracted adjacent objects are available (Yes at S185), the controller 101 returns to step S181 and repeats a sequence of the above-mentioned processes to extract the feature point. If other extracted adjacent objects are unavailable (No at S185), a sequence of the processes terminates and proceeds to the process at step S19 in FIG. 6.

Mark Candidate Extraction Process

With reference to a flowchart in FIG. 9, the description below explains a marker candidate extraction process as the process at step S19 in FIG. 6. The marker candidate extraction process extracts a candidate from feature points extracted by the process at step S18 as follows while the candidate can contain color measurement position P belonging to the straight line concatenating the feature points with each other.

The controller 101 reads one feature point (1) recorded by the process at step S182 in FIG. 8 (step S191) and then determines whether another feature point (2) belongs to the straight line passing through color measurement position P (step S192). If another feature point (2) is available (Yes at S192), the controller 101 records the feature point (1) and the feature point (2) as marker candidates (step S193).

When another feature point (2) is unavailable (No at S192) or the process at step S193 is completed, the controller 101 determines whether all the feature points recorded by the process at step S182 in FIG. 8 are checked (step S194). If all the feature points are not checked (No at S194), the controller 101 returns to step S191 and repeats a sequence of the processes to extract a marker candidate. If all the feature points are checked (Yes at S194), the controller 101 terminates a sequence of the processes and proceeds to the process at step S20 in FIG. 6.

Figure 10:
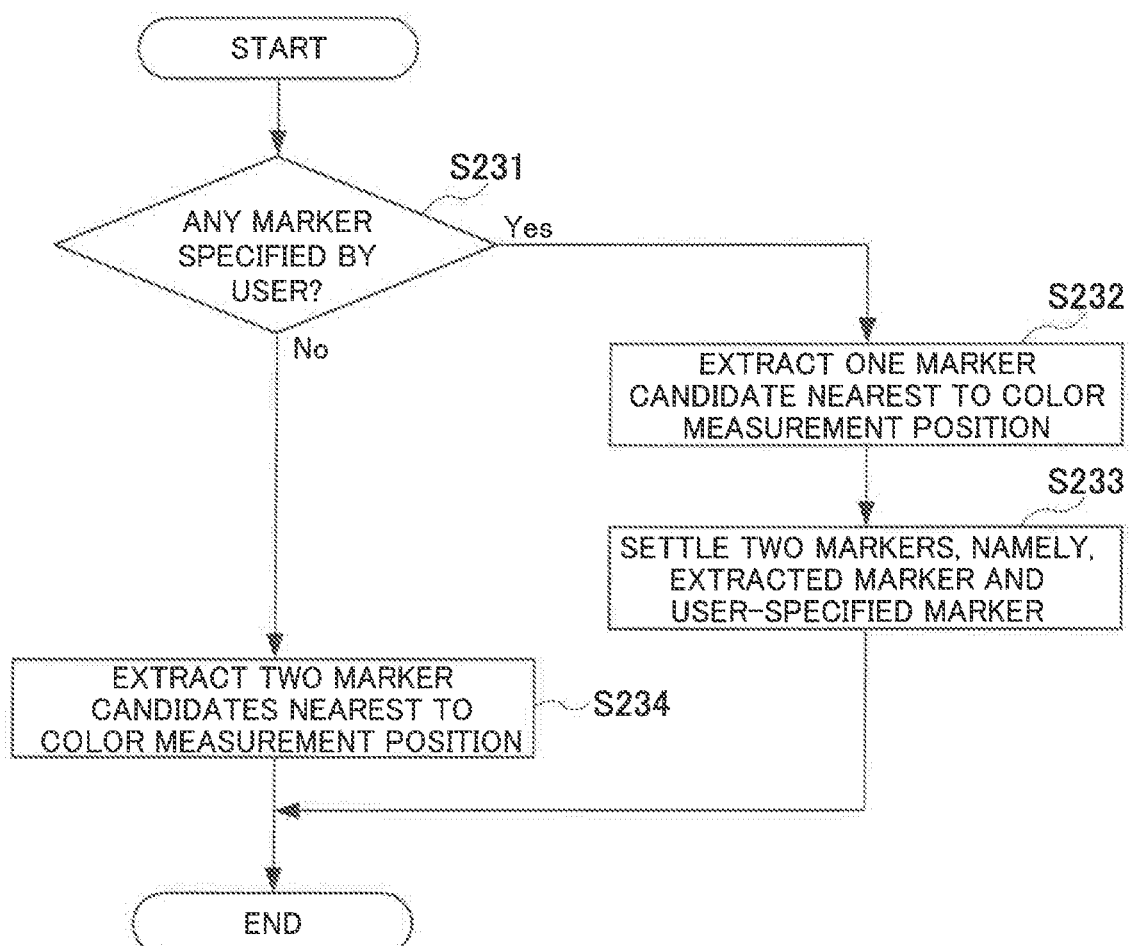
FIG. 10 is a flowchart illustrating a flow of a marker candidate narrowing process.

With reference to a flowchart in FIG. 10, the description below explains the marker candidate narrowing process as the process at step S23 in FIG. 6. The marker candidate narrowing process narrows marker candidates as follows when the process at step S19 in FIG. 6 extracts a plurality of candidates and the user does not select a candidate.

The controller 101 determines whether the user specifies a marker (step S231). If the user specifies a marker (Yes at S231), the process extracts one marker candidate nearest to color measurement position P (step S232) and then settles two markers, namely, the extracted marker and the user-specified marker (step S233). If the user does not specify a marker (No at S231), the controller 101 extracts two marker candidates nearest to color measurement position P and settles the markers (step S234).

Alternative Color Measurement Position Extraction Process

Figure 11:
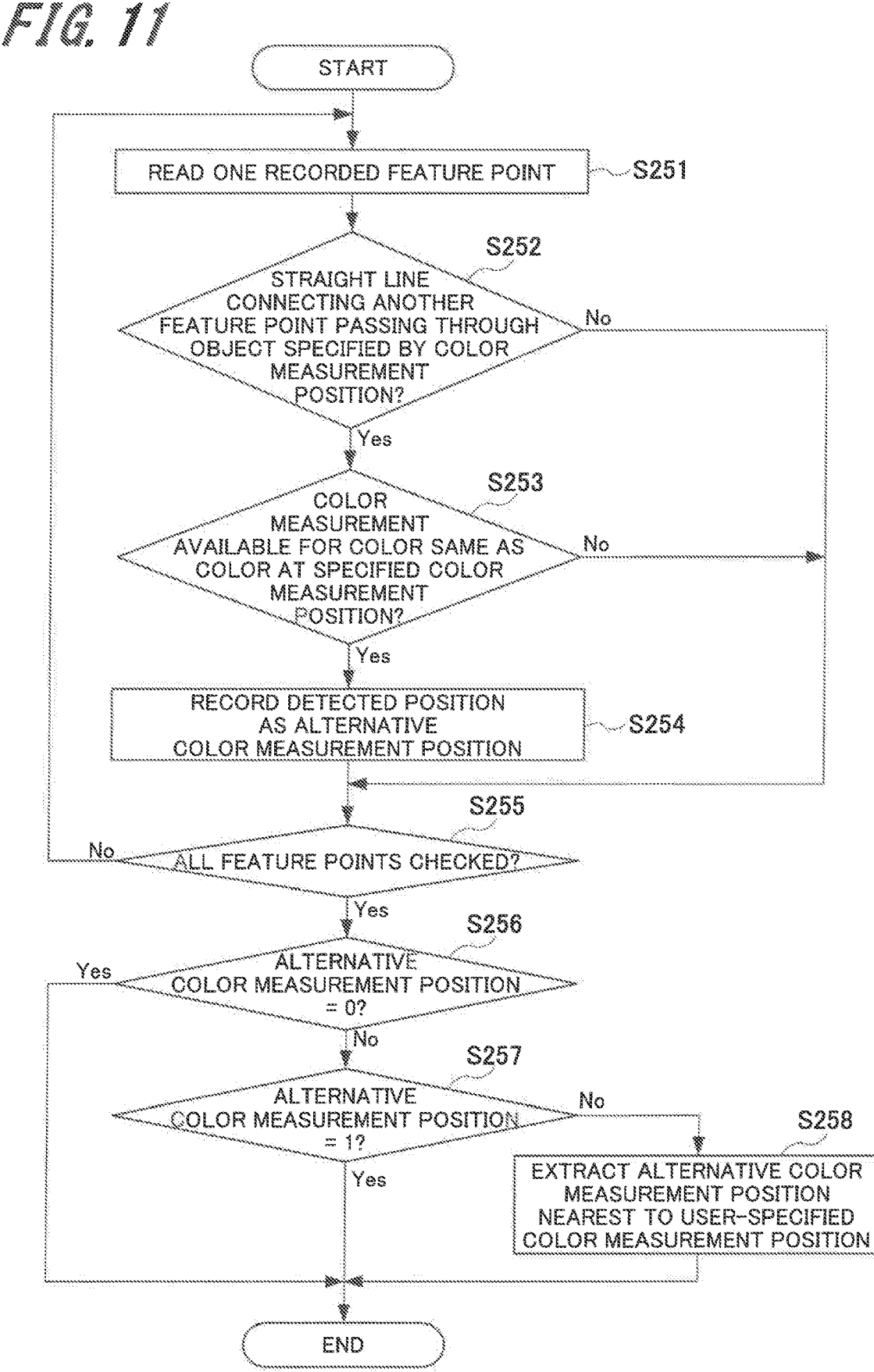
FIG. 11 is a flowchart illustrating a flow of an alternative color measurement position extraction process.

With reference to a flowchart in FIG. 11, the description below explains the alternative color measurement position extraction process as the process at step S25 in FIG. 6. When no marker object is available, the alternative color measurement position extraction process extracts an alternative color measurement position, namely, a candidate nearest to the object position specified as color measurement position P from the extracted marker object candidates belonging to the straight line concatenating the candidates with each other and containing objects targeted at the color measurement.

The controller 101 reads one feature point recorded by the process at step S182 in FIG. 8 (step S251) and then determines whether the straight line connecting another feature point passes through the object specified by color measurement position P (step S252). When it is determined that the straight line connecting another feature point passes through the object specified by color measurement position P (Yes at S252), the controller 101 determines whether the color measurement is available for a color same as the color at the specified color measurement position P (step S253). If the color measurement is available (Yes at S253), the detected position is recorded as the alternative color measurement position (step S254).

The controller 101 determines whether all the feature points are checked (step S255). If all the feature points are not checked (No at S255), the process at steps S251 through S254 is performed repeatedly. It may be determined that the straight line connecting another feature point does not pass through the object specified by color measurement position P in the process at step S252 (No at S252) or that the color measurement is unavailable for a color same as the color at color measurement position P specified by the process at step S253 (No at S253). In such a case, the controller 101 proceeds to step S255.

If all the feature points are checked (Yes at S255), the controller 101 determines whether the alternative color measurement position is 0 (step S256). If the alternative color measurement position is 0 (Yes at S256), a sequence of the processes to extract the alternative color measurement position terminates. If the alternative color measurement position is not 0 (No at S256), the controller 101 determines whether the alternative color measurement position is 1 (step S257). If the alternative color measurement position is not 1 (No at S257), the process extracts an alternative color measurement position nearest to the user-specified color measurement position (step S258). A sequence of the processes to extract the alternative color measurement position terminates.

When the user specifies color measurement position P on the printed matter 6, the above-mentioned color measuring position provision system (method) extracts a marker object candidate based on the specified color measurement position P and provides the user with the two extracted points. In response to the provision, the user performs the scan color measurement at color measurement position P on the printed matter 6 by aligning the guide slit 5a of the guide rail 5 to the two provided points (see FIG. 5) and moving the manual color measuring instrument 3 along the guide slit 5a. Namely, the scan color measurement is performed along the straight line (hereinafter also referred to as a "color measurement line") connecting the two provided points. A storage (such as the RAM 104 in FIG. 3) chronologically stores one-dimensional color measurement values such as color information L*a*b* in a color space (uniform color space) measured by the manual color measuring instrument 3.

Color Measurement Value Detection System

The description below explains a color measurement value detection system that detects color measurement values at color measurement position P based on color measurement results from the manual color measuring instrument 3 at color measurement position P. The color measurement value detection system is configured as software in the personal computer 1 and can detect color measurement values based on not only color measurement results (one-dimensional) from the manual color measuring instrument 3, but also color measurement results (two-dimensional) from a known automatic color measuring instrument. The controller 101 (see FIG. 3) of the personal computer 1 implements functions of the color measurement value detection system.

Figure 12:
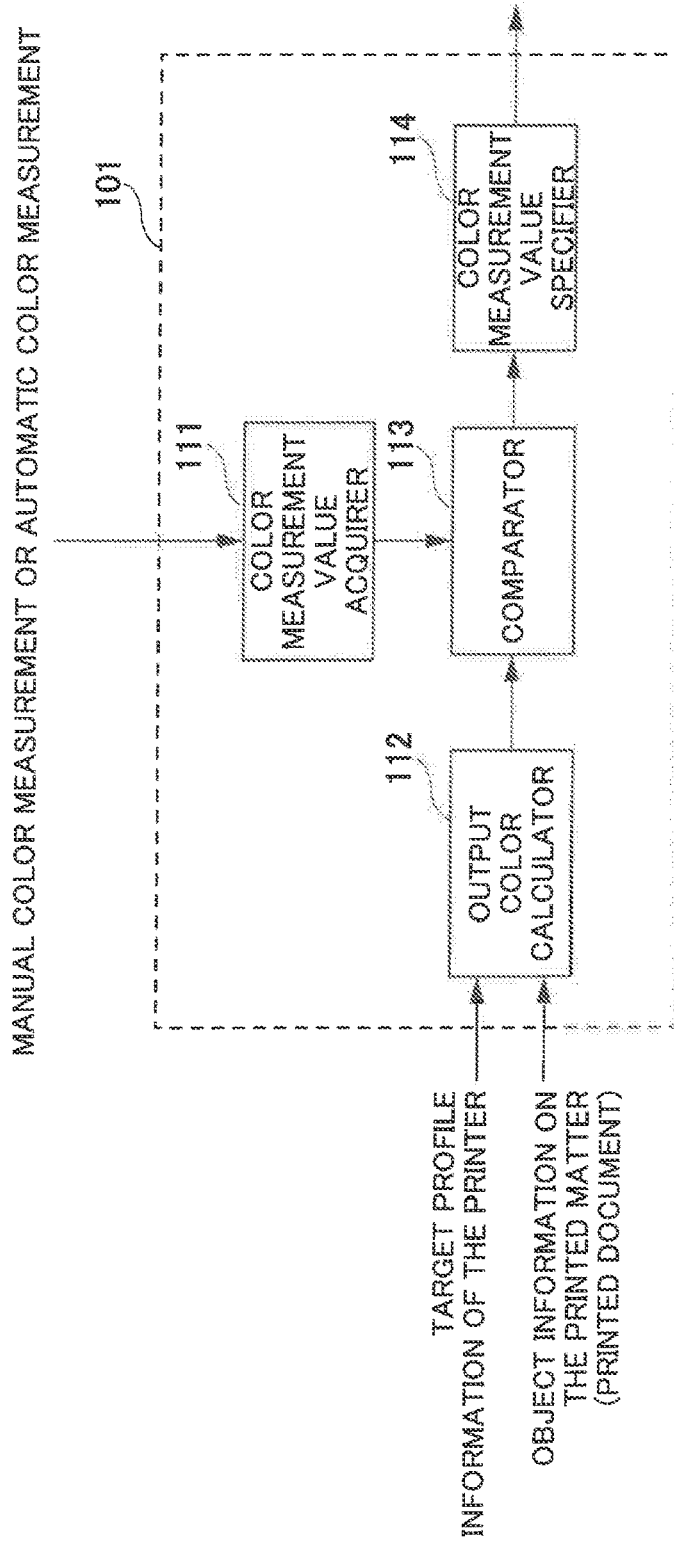
FIG. 12 is a function block diagram illustrating a controller to provide functions of a color measurement value detection system according to the embodiment of the present invention.

FIG. 12 is a function block diagram illustrating the controller 101 to provide functions of the color measurement value detection system according to the embodiment of the present invention. As illustrated in FIG. 12, the controller 101 to implements functions of the color measurement value detection system includes function blocks such as a color measurement value acquirer 111, an output color calculator 112, a comparator 113, and a color measurement value specifier 114.

The color measurement value acquirer 111 acquires one-dimensional color measurement values from color measurement values (one-dimensional) measured by the manual color measuring instrument 3 and chronologically stored or from color measurement values (two-dimensional) measured by the automatic color measuring instrument. The output color calculator 112 calculates an object output color (theoretical value) at a color measurement position from the target profile information of the printer 2 and object information at the color measurement position on the printed matter 6.

The comparator 113 compares a one-dimensional color measurement value acquired by the color measurement value acquirer 111 with an object output color (theoretical value) calculated by the output color calculator 112. Based on a comparison result from the comparator 113, the color measurement value specifier 114 specifies a color measurement value for the object or the position requested by the user according to a match in a phase profile of color measurement values. The phase profile provides two-axial data comprised of positional information at the color measurement position and color information L*a*b* about a color space corresponding to each positional information. FIG. 13 illustrates the phase profile.

It is supposed that color difference ΔE for each color is recorded according to a color measurement history of the printer 2 when a phase profile of color measurement values is compared with a phase profile of theoretical values. In this case, color difference ΔE is assumed to be applicable as error information between the color measurement value and the output color (theoretical value) for the comparison process.

Specifically, the same color is determined depending on whether the color difference+α is satisfied with reference to the theoretical value. When no color measurement history is available, the same color is determined based on color difference information ΔE specified by the user or installed in the system.

When it is impossible to detect a color measurement value for the object or the position requested by the user, a color measurement value is compared with the object information near the color measurement line on the printed matter 6 to detect whether the color measurement position is misaligned. When the misalignment of the color measurement position is detected, the user is notified of a misalignment direction detected, namely, the detected direction of the misaligned color measurement position.

When the object size at the color measurement position is larger than width W of the guide slit 5a of the guide rail 5, for example, the color measurement value specifier 114 uses chronological information about color measurement results to estimate data near the color measurement position and extract a color measurement value.

As above, in the color measurement value detection system according to the embodiment, the output color calculator 112 calculates an object output color (theoretical value) at color measurement position P based on the target profile information of the printer 2 and the object information about the printed matter 6. The comparator 113 compares a color measurement value (one-dimensional) from the color measuring instrument (manual color measuring instrument or automatic color measuring instrument) with an output color calculated by the output color calculator 112. The color measurement value specifier 114 specifies a color measurement value for the object or the position requested by the user based on the degree of match in the phase profile of color measurement values. This process of specifying color measurement values can correctly detect a color to be measured at the color measurement position on the printed matter 6.

Color Measurement Value Detection Method

Figure 14:
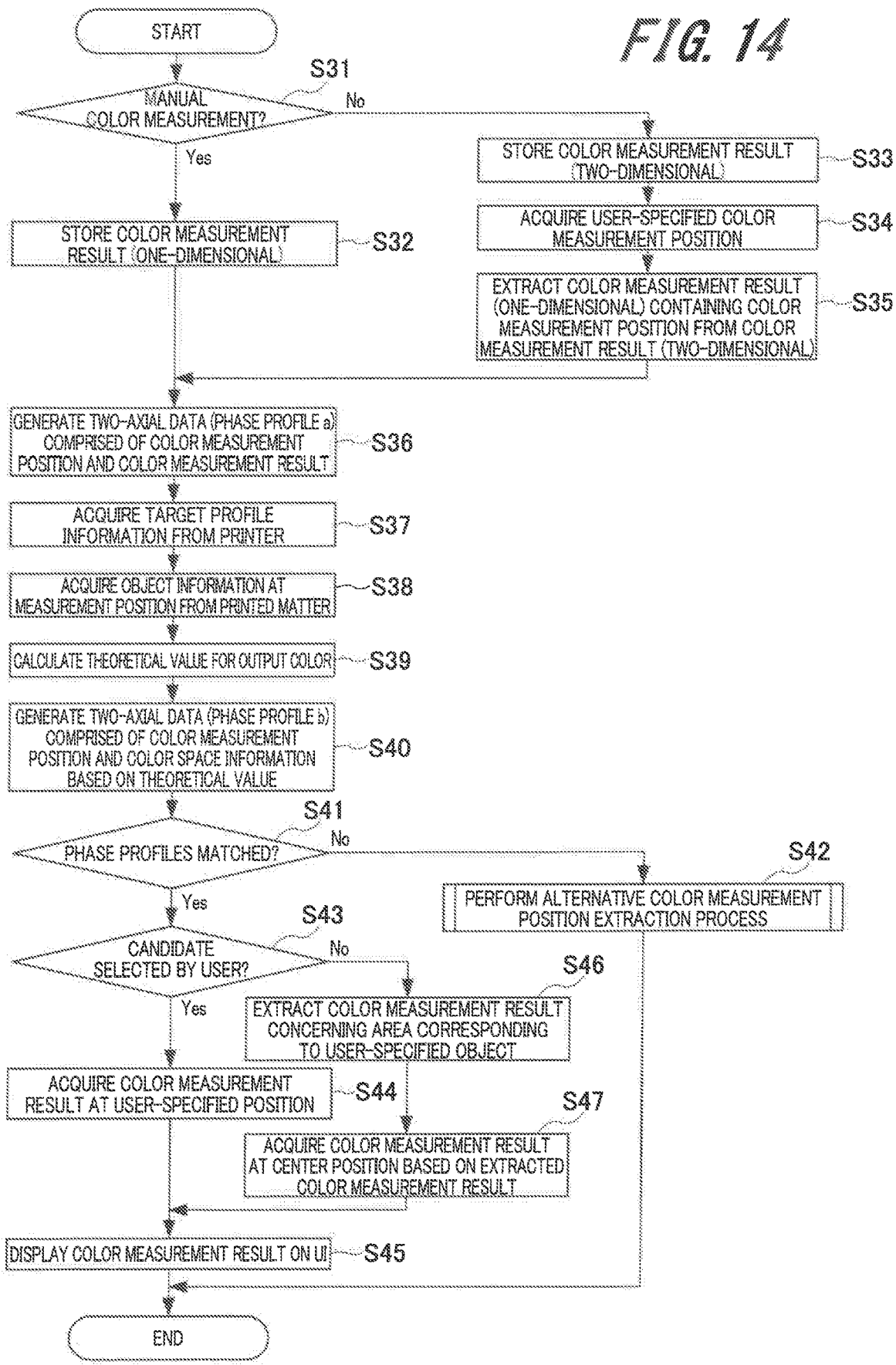
FIG. 14 is a flowchart illustrating a process flow of a color measurement value detection method performed in the color measurement value detection system according to the embodiment of the present invention.

With reference to a flowchart in FIG. 14, the description below explains a process of a color measurement value detection method performed in the color measurement value detection system according to the above-mentioned configuration. A series of processes to detect a color measurement value is performed under control of the controller 101. The same also applies to processes to be described later.

The controller 101 determines whether the manual color measurement is performed by using the manual color measuring instrument 3 (step S31). If the manual color measurement is performed (Yes at S31), the storage stores a color measurement result (one-dimensional) from the manual color measuring instrument 3 (step S32). If the manual color measurement is not performed (No at S31), automatic color measurement is performed by using an automatic color measuring instrument. When the automatic color measurement is performed, the controller 101 allows the storage to store a color measurement result (two-dimensional) from the automatic color measuring instrument (step S33), acquires color measurement position P specified by the user (step S34), and then extracts a color measurement result (one-dimensional) containing color measurement position P from the color measurement result (two-dimensional) generated by the automatic color measuring instrument (step S35).

The controller 101 generates two-axial data (phase profile a) comprised of color measurement position P and the color measurement result (step S36), acquires the target profile information from the printer 2 (step S37), and then acquires the object information at measurement position P from the printed matter 6 (step S38). See FIG. 13 for an example of the phase profile as two-axial data comprised of the positional information about the color measurement and color information L*a*b* about the color space corresponding to each positional information.

The controller 101 calculates an object output color (theoretical value) at color measurement position P from the target profile information of the printer 2 and the object information at color measurement position P (step S39) and then generates two-axial data (phase profile b) comprised of color measurement position P and color information L*a*b* about the color space based on the calculated theoretical value (step S40).

The controller 101 compares phase profile a generated at step S36 with phase profile b generated at step S40 and determines whether both phase profiles match (step S41). If both phase profiles do not match (No at S41), the controller 101 performs an alternative color measurement position extraction process (step S42) and terminates a sequence of processes to detect a color measurement value. The alternative color measurement position extraction process will be described in detail later.

If both phase profiles match (Yes at S41), the controller 101 determines whether the user selects a candidate (step S43). If the user selects a candidate (Yes at S43), the process acquires a color measurement result at the user-specified position (step S44). The controller 101 displays the acquired color measurement result on the displayer 106 (UI) of the personal computer 1 (step S45).

If the user does not select a candidate (No at S43), the controller 101 extracts a color measurement result concerning an area corresponding to the user-specified object (step S46), acquires a color measurement result at the center position based on the extracted color measurement result (step S47), and then proceeds to step S45 to display the acquired color measurement result.

Alternative Color Measurement Position Extraction Process

With reference to a flowchart in FIG. 15, the description below explains an alternative color measurement position extraction process as the process at step S42. The alternative color measurement position extraction process is performed when phase profile a generated at step S36 does not match phase profile b generated at step S40 as a result of the determination process at step S41.

The controller 101 extracts a position corresponding to the mismatch found after the comparison between phase profile a and phase profile b (step S421), acquires a color measurement value for the extracted mismatch position as color measurement value x (step S422), and then calculates object output color (theoretical value) y near color measurement position P (step S423).

The controller 101 determines whether to have found an object causing color measurement value x and output color (theoretical value) y to match (x=y) (step S424). If such an object is not found (No at S424), a sequence of the processes to extract the alternative color measurement position terminates.

If an object causing x=y is found (Yes at S424), the controller 101 determines whether the number of found objects is 1 (step S425). If the number of found objects is 1 (Yes at S425), the displayer 106 (UI) of the personal computer 1 displays a direction that deviates from the color measurement position (step S426).

If the number of found objects is not 1 (No at S425), the controller 101 calculates a phase profile of theoretical values passing through the found object (step S427) and then determines whether the color measurement result matches the phase profile calculated at step S427 (step S428). If a match is found (Yes at S428), the controller 101 proceeds to step S426 and allows the displayer 106 (UI) to display a direction deviating from the color measurement position.

If the color measurement result does not match the phase profile calculated at step S427 (No at S428), the controller 101 determines whether all the objects found at step S424 are checked (step S429). If all the objects are checked (Yes at S429), a sequence of the processes to extract the alternative color measurement position terminates. If all the found objects are not checked (No at S429), the controller 101 returns to step S427 and repeatedly performs the process from step S427 to step S429.

Modification

While there has been described the specific embodiment of the present invention, it is to be distinctly understood that the present invention is not limited to the scope of the description of the above-mentioned embodiment. The above-mentioned embodiment can be variously modified or improved within the spirit and scope of the invention and the modified or improved embodiment is also included in the technical scope of the invention. The scope of the present invention should be interpreted by terms of the appended claims.

REFERENCE SIGNS LIST

1 . . . personal computer, 2 . . . printer, 3 . . . manual color measuring instrument, 4 . . . communication line, 5 . . . guide rail, 6 . . . printed matter, 11 . . . keyboard, 12 . . . mouse, 21 . . . print engine, 22 . . . printer controller, 101 . . . controller, 105 . . . color measurement position specifier, 106 . . . displayer, 111 . . . color measurement value acquirer, 112 . . . output color calculator, 113 . . . comparator, 114 . . . color measurement value specifier

What is claimed is:

1. A color measuring system comprising:
a hardware processor configured to:
specify a color measurement position on an image that is displayed on a display screen;
identify a plurality of marker object candidates to facilitate locating the color measurement position specified by the color measurement position specifier, and
extract, for each of the marker object candidates, a feature for use during color measurement; and
wherein the marker object candidates enable a user to locate the specified color measurement position.

2. The color measuring system according to claim 1,
wherein the hardware processor identifies, as the marker object candidates, objects within reach of a guide rail of the manual color measuring instrument from the color measurement position out of candidates such as an object capable of being aligned with a guide rail of a manual color measuring instrument, an edge of a character and an image object, and one side of an image object aligned with a guide slit of the guide rail.

3. The color measuring system according to claim 2,
wherein the hardware processor identifies an object that belongs to a candidate extracted as the marker object and includes the color measurement position on a straight line concatenating candidates.

4. The color measuring system according to claim 3,
wherein, when a plurality of the marker objects are identified, the hardware processor automatically settles the marker object out of a plurality of objects.

5. The color measuring system according to claim 3,
wherein the hardware processor settles the marker object based on a priority such as one of a color difference capable of edge detection available to an object near the color measurement position during color measurement, the color measurement position available between the marker objects, and the marker object being nearest to the color measurement position.

6. The color measuring system according to claim 3,
wherein, when a plurality of the marker objects are extracted, the hardware processor settles the marker object selected by a user from a plurality of objects.

7. The color measuring system according to claim 1, wherein none of the marker object candidates includes the specified color measurement position.

8. The color measuring system according to claim 1, wherein the hardware processor is configured to identify the marker object candidates after the color measurement position is specified.

9. The color measuring system according to claim 1, wherein the marker object candidates are identified based on the specified color measurement position.

10. A color measuring method comprising:
specifying a color measurement position on an image that is displayed on a display screen;
identifying a plurality of marker object candidates to facilitate locating the specified color measurement position and notifying a user of the marker object candidates; and
extracting, for each of the marker object candidates, a feature for use during color measurement.

11. The color measuring method according to claim 10, wherein none of the marker object candidates includes the specified color measurement position.

12. The color measuring method according to claim 10, wherein the marker object candidates are identified based on the specified color measurement position.

13. The color measuring method according to claim 10, wherein the hardware processor is configured to identify the marker object candidates after the color measurement position is specified.

* * * * *